Patented July 28, 1942

2,290,905

UNITED STATES PATENT OFFICE 2,290,905

PROTECTIVE METAL COVERING

William H. Butler, Bloomfield, N. J., assignor to Bakelite Corporation, a corporation of New Jersey No Drawing. Application November 9, 1938, Serial No. 239,672

5 Claims. (Cl. 117—26)

This invention relates to coverings for metallic surfaces and more particularly those of the oil type which dry upon exposure to air.

Metallic surfaces are characterized by a hardness and smoothness of surface for which many types of coating compositions, suitable for application to wood and paper board and similar yielding fibrous or porous surfaces, have not the necessary adhesion. Furthermore coatings for metals must possess toughness, flexibility and elasticity so that no cracking takes place upon expansion and contraction or upon bending of the metallic structure. In addition the coating films must not become brittle at low temperatures or become soft or sticky under conditions of humidity and high temperatures. There are further conditions to be met such as durability, waterproofness, resistance to weathering, etc. Particularly destructive to metal coatings are the conditions to be found associated with dam structures, such as lock gates, operating machinery, bridges and similar structures which are exposed to weathering, changing conditions of contact with water and abrasion or wear such as is caused by the rubbing action of logs and other debris. All these requirements have indicated the necessity or desirability of smooth enamel-like coatings as most effective for their accomplishment and particularly when high resistance to abrasion is required.

It is therefore most surprising and contrary to hitherto accepted expectations to have discovered that granular finishes of the character hereinafter described are so far superior to smooth surface finishes as to be of an entirely different order. For instance, accelerated abrasion tests in use by the U. S. Engineers Office show that coatings of the usual kind withstand the test for approximately eleven days; the granular finishes of this invention have passed one hundred and twenty-five days.

For the accomplishment of these results this invention provides a cementing or primer coat on a metal base followed by a layer of granular material, such as sand, quartz, hard rock granules, powdered glass, carborundum or other suitable materials, and a shrouding or enveloping of the granules by an exposed or top covering layer of one or more coats of a film-forming material, which can be similar to the primer coat, in order to lock together the granules held by the cementing primer coat. For the cementing primer it has been found that an oil-extended or oil-plasticized resin composition, which may contain such extending materials such as pigments and the like, and one that is capable of yielding a film that hardens either by oxidation or polymerization to a non-softening state is required and particularly one of a definite oil length and viscosity as will hereinafter appear. The composite coverings produced in this manner are continuous and possess good adhesion to metal, and the granular material is firmly bonded together and interlocked. Such composite coverings display particularly great resistance to abrasion or weathering, and cracking or peeling does not occur.

The primer which acts also as a bonding or cementing agent for securing the granules to the metallic surface is an oil type including a resin; this forms a vehicle to which other ingredients as driers, thinners, pigments, etc. can be added, and desirably corrosion resisting pigments such as iron oxide and other metal oxides, zinc chromate, etc. in fine powder form are ground into the vehicle. It has been found that durability and resistance to abrasion are dependent upon the proportions of oil and resin in the binder, and that in order to function as a granule-cementing agent the primer also requires adjustment as to viscosity. In general the primer should contain from 20 to 100 gallons of oil to each 100 pounds of resin and preferably should be of a 25 to 60 gallon length for best results. The viscosity to which the composition is adjusted depends in addition to the proportion of resin to oil upon the extent to which it is bodied; it must be such as to secure a wetting of the granules and yet remain in place without objectionable flow. When solvents are included in order to secure good brushing action or for spraying, the solvents can be permitted to evaporate from an applied coating until the desired viscosity or tackiness is attained to hold granules which are then applied, in place.

For the resinous constituent fatty acid modified alkyd resins in admixture with a phenolic resin and more especially the oil-soluble phenolic resins are found much superior to natural resins such as copal, dammar, rosin, etc. and synthetic products like coumarone and rosin esters because of their exceptional durability and resistance to weathering; and, moreover, they display marked adhesive properties for the superposed grains under all normal temperature and weather conditions. Phenolic resins of the oil-soluble type are in general obtained by reacting a phenolic body, which may be a phenol, cresol or one of the higher substituted homologues or derivatives thereof, with a methylene-containing agent, namely formaldehyde or its polymers or compounds such as acetaldehyde, furfural, benzaldehyde, etc. in the presence of a suitable catalyst. Resins prepared from phenol and some cresols are usually not miscible by themselves with oils but can be made so by blending them with sufficient proportions of rosin, ester gum or other natural resins; such additions, however, injuriously affect the highly desirable weathering properties of the phenolic resins in proportion to the amount of rosin included and for that reason are not desirable. Oil-soluble or suspensible resins can, however, be prepared from lower phenols without the addition of rosin or the like by including an oil such as tung oil as a reactant in preparing the resin and preferably by first reacting the oil with the phenol and subsequently reacting this phenol-oil complex with a methylene-containing agent. The higher phenols, such as the alkyl or phenyl substituted phenols, form resins which in themselves are miscible or suspensible in drying oils and which therefore are suitable for use as priming or adhesive coatings, when extended with drying oils.

The fatty oils best suited for the primer are the drying oils such as tung, linseed, rape seed, soya, Perilla, etc.; non-drying oils, such as castor oil can, however, also be included. The oils together with the resins mentioned form mixtures which are soluble in the usual volatile solvents as alcohol, mineral spirits, turpentine, etc. Any desired color can be given the primer by merely pigmenting the resins which in turn retain the colors by their protecting effect on the pigments or dyes. The amount of pigment which can be added is limited only by the necessity of obtaining flexible films in the composite coatings.

A feature of the present invention lies in the granular finish. The granules are sprayed or dashed on to the primer following its application; or if the primer has been thinned, solvents are first permitted to evaporate until the desired tackiness is obtained before the granules are applied. Suitable materials for the granules include quartz, crushed silica, sand, rock, pulverized glass and other hard inert materials of jagged angular shape; this type of granule permits interlocking and therefore minimizes any loss on weathering or from abrasion. The granules should not be smaller than 100 mesh or larger than 30 mesh and those found preferable range from 40 to 80 mesh. The amount of granules applied depends upon the sizes and their mixtures, but the preferred blend is a mixture having from 40 to 60 per cent by volume of voids; this regulates the amount of binder which fits between the granules which in turn allows the primer to retain the necessary flexibility and elasticity for yielding with temperature and other changes. If the amount of granules used is insufficient, the finish is undesirably lacking in abrasion resistance. It is preferred to have an admixture within the range stated, so that the smaller particles are embedded between the larger particles to give a maximum of resistaice to abrasion.

Over the granules one or more top coats are applied depending upon the type of service and the exposure to which the metal structure is subjected. Such a coat has for its vehicle one that is similar to the primer vehicle, but with aluminum paste substituted for the primer fillers.

After drying the primer and the granules are given a top coat with a phenolic resinous vehicle which can be similar to the primer; preferably, however, the resinous vehicle is mixed with aluminum so that the granules are entirely covered or enshrouded along their exposed surfaces with a phenolic resin-aluminum coating. One or more top coats can be applied, depending upon the type of service and exposure demanded from the protected metal structure.

Several examples embodying both pigmented and clear vehicles and adapted for various uses as specifically enumerated herein are given below.

*Example 1.*—A vehicle for use both in a primer and in a top coat is made from 100 pounds of a high melting non-heat-reactive, oil-soluble, phenolic resin, mixed together with 18 gallons of China wood oil and run to 500° F. in 30 minutes. 4 pounds of lead acetate are added and heated to about 540° F. in 5 to 10 minutes, and 15 gallons more of China wood oil are included. Upon heating to 450° F. and holding at this temperature for 5 to 10 minutes or longer a composition is obtained which is tacky, viscous solid at room temperature with practically no flow and having a viscosity of C to E (on a Gardner Holdt air bubble viscosimeter) when reduced to 55 per cent solids with a mineral spirits thinner. Soluble metallic driers are added sufficient in amount to yield when air-dried a hard film in 6 to 8 hours; the film is not affected by a 6 per cent NaOH solution over a period of 24 hours or longer.

A primer for attaching granules to a metal surface is made by grinding together 4 pounds of iron oxide, 2 pounds of zinc chromate, 1 pound of diatomaceous silica, 1 pound of magnesium silicate, and 7½ pounds of the foregoing vehicle. A primer so made after grinding and aging for a period of 6 weeks, had a viscosity of 222 seconds to the break or 77 seconds for the first 50 cc. using a Ford cup with a number 4 orifice. When brushed on a metal surface, it yielded in 3 to 10 minutes a film viscous enough for holding and bonding a succeeding application of granules. A primer of this character coated on metal and exposed to a tide range test of intermittent exposure to salt water and sunlight showed no failure over a period of six months; the embedded granules improved the integrity of the coating by the resistance to abrasion and the protection afforded the primer.

*Example 2.*—A vehicle for use in a primer and also as a top coat is made as follows from 100 pounds of an oil-soluble, non-heat-reactive resin, having a melting point of 190 to 210° F. using the Ball and Ring Method, mixed with 25 gallons of China wood oil and run to 465° F. in 40 minutes; it is held at this temperature for 35 to 45 minutes or until it reaches a heavy drip condition which yields a viscous, tacky pill with practically no flow at room temperature. It is then thinned with mineral spirits at 58 per cent solids and to a viscosity of E. Enough driers are added to yield a film which hardens in air fairly hard in 6 to 8 hours. Such a film is resistant to a 5 per cent NaOH solution for 24 hours or longer.

An anti-corrosive metal primer for attaching granules to a metal surface is made by grinding together 57 pounds of red lead paste, 5.4 pounds of zinc chromate, 9 pounds of magnesium silicate, and 27 pounds of the foregoing vehicle. After grinding and aging one month, a primer so made had a viscosity of 5 minutes and 21 seconds to the break, or 109 seconds for the first 50 cc. using the Ford cup with the number 4 orifice. The primer, when brushed on a metal surface, yielded a sufficiently viscous coat in 2 to 7 minutes to hold a mixture of granules ranging from 30 to 80 mesh without sagging. The primer showed no failure upon six months' exposure to the tide range test.

*Example 3.*—A top coat for shrouding granules embedded in a primer made according to Examples 1 and 2, is obtained by mixing together 2 pounds of aluminum paste with 7½ pounds of vehicle in Example 1. This type of shrouding coat has special use for application on metal. Pigments can be used to obtain varying color effects, but they should be used in a proportion which will not affect the flexibility of the film.

*Example 4.*—Another type of vehicle suitable for use as primer for attaching granules to the surface but preferably for shrouding the granules can be made from 400 grams of phthalic anhydride reacted with 100 grams of an oil-soluble, phenolic resin and 290 grams of glycerine for 25 minutes at 215° C. Then are added 100 grams of phthalic anhydride and 525 grams of linseed fatty acids in small additions regaining 220° C. after each addition. After adding all of the linseed fatty acids, the mass is heated to 220° C. and held at this temperature until the acid number is reduced to below 10. The vehicle so obtained is reduced to viscosity E with Solvesso No. 2 and soluble driers are added to yield a film becoming hard upon air-drying for 4 to 8 hours. Pigments can be incorporated as in Example 3.

In place of linseed fatty acids other drying oil fatty acids can be substituted and synthetic resins, especially the 100 per cent oil-soluble phenolic resins, can be substituted for a portion of the phthalic anhydride in order to improve the chemical resistance of the coating. A flexible water-resistant type is also obtained by blending 50 parts of the vehicle of Example 1 with 50 parts of the vehicle of this example.

*Example 5.*—A vehicle which produces a very flexible primer and top coat is made from 100 pounds of an oil-soluble, phenolic, non-heat-reactive resin, mixed with 35 gallons of alkali refined linseed oil and run to a temperature of 560° F. in 50 minutes; it is held at this temperature for 4 hours until a small sample when cool is tacky and shows practically no flow at 25° C. It is then checked with 15 gallons of China wood oil, held at 450° F. for 30 minutes, and reduced to a viscosity of E to F with mineral spirits. Fillers can be incorporated to make the primer as in the preceding examples.

The preparation of weather resistant coverings from any of these primers is as follows: A primer as described in Example 2 is applied by brush or spray gun and while still wet or approximately 1 to 5 minutes after application, mixed crushed silica granules of 35 to 70 mesh are sprayed onto the wet coating. The granules, which are wet by the primer, adhere to the surface and some of the smaller granules such as those of 50 to 70 mesh, become completely embedded and the larger granules are only partially embedded. The weight of the wet primer, including the volatile, is about 3.8 pounds per 100 square feet of surface, but it can vary in a wider range of 3.3 to 5.5 pounds per 100 square feet of surface depending on the thickness of coating applied. The weight of granules which adhere to the surface approximates 12 to 16 pounds per 100 square feet of surface. The actual dry weight of the primer in the composite covering is from 18 to 28% and 72 to 82% by weight is constituted by granules. The blend of 35 to 70 mesh granules has an apparent specific gravity of 1.37 and 50 per cent by volume of voids. A top coat such as the vehicle of Example 1, having admixed 2 pounds of aluminum paste to each gallon of the vehicle, is applied by brush or spray gun to shroud the granules that are not completely embedded and to obtain a continuous film over and around the surfaces of the granules. The weight of top coat used is about 3.6 to 4.5 pounds per 100 square feet.

What is claimed is:

1. Method of protecting a metal surface such as one subject to abrading action of a body of water and debris therein by a covering having a roughened surface which comprises forming a vehicle of a fatty oil and a fusible oil-soluble phenol-aldehyde resin in the proportion of 100 pounds of the resin to each 20 to 100 gallons of the oil, heating the vehicle to a viscous condition at room temperature, adding thinner and pigment to form a primer, applying the primer to the metal surface, applying a blend of granules of sizes falling within a range of from 30 to 100 mesh to the primer coating when in a viscous condition, and enveloping the granules with a top coat comprising the vehicle and an aluminum filler.

2. Method of protecting a metal surface such as one subject to abrading action of a body of water and debris therein by a covering having a roughened surface which comprises coating the surface with an oil composition containing 100 pounds of an oil-soluble phenol-aldehyde resin to each 20 to 100 gallons of a fatty oil, adding a layer of granules of sizes falling within a range of from 30 to 100 mesh to the coating when in a viscous condition, and enveloping the granules with a top coat of a composition of the resin and a fatty oil.

3. Article of manufacture resistant to abrading action such as that of a body of water and debris therein comprising in combination a base having a metal surface and a protective covering on the surface comprising a primer coat of a fatty oil and an oil-soluble phenol-aldehyde resin in the proportions of 100 pounds of the resin to each 20 to 100 gallons of the oil, a layer of granules of sizes falling within a range of from 30 to 100 mesh applied to the primer coat, and a top coat on the granules of a fatty oil and resin, the said protective covering providing a roughened abrasion-resistant surface.

4. Article of manufacture resistant to abrading action such as that of a body of water and debris therein comprising in combination a base having a metal surface and a protective covering on the surface comprising a primer coat of a fatty oil and an oil-soluble phenol-aldehyde resin and including a metal oxide, granules of sizes falling within a range of from 30 to 100 mesh applied to the primer coat, and a top coat on the granules of a fatty oil and resin including aluminum paste, the said protective covering providing a roughened abrasion-resistant surface.

5. Article of manufacture resistant to abrading action such as that of a body of water and debris therein comprising in combination a base having a metal surface and a protective covering on the surface comprising a primer coat of a fatty oil and an oil-soluble phenol-aldehyde resin, granules of sizes falling within a range of from 30 to 100 mesh applied to the primer coat, and a top coat on the granules of a fatty oil and resin, the said protective covering providing a roughened abrasion-resistant surface.

WILLIAM H. BUTLER.

CERTIFICATE OF CORRECTION.

Patent No. 2,290,905.　　　　　　　　　　　　　　　July 28, 1942.

WILLIAM H. BUTLER.

It is hereby certified that error appears in the printed specification of the above numbered patent requiring correction as follows: Page 2, second column, line 18, for "is tacky" read --is a tacky--; and line 25, for "6 per cent" read --5 per cent--; and that the said Letters Patent should be read with this correction therein that the same may conform to the record of the case in the Patent Office.

Signed and sealed this 1st day of September, A. D. 1942.

(Seal)　　　　　　　　　　　　　　　　　　　　Henry Van Arsdale,
　　　　　　　　　　　　　　　　　　Acting Commissioner of Patents.